US008613472B2

(12) United States Patent
Ott et al.

(10) Patent No.: US 8,613,472 B2
(45) Date of Patent: Dec. 24, 2013

(54) RADIAL ROTARY FEEDTHROUGH AND BUSHING THEREFOR

(75) Inventors: Stephan Ott, Wiesbaden (DE); Dennis Hoff, Mainz (DE)

(73) Assignee: GAT Gesellschaft für Antriebstechnik mbH, Geisenheim (DE)

( * ) Notice: Subject to any disclaimer, the term of this patent is extended or adjusted under 35 U.S.C. 154(b) by 0 days.

(21) Appl. No.: 13/510,696

(22) PCT Filed: Nov. 11, 2010

(86) PCT No.: PCT/EP2010/067327
§ 371 (c)(1),
(2), (4) Date: May 18, 2012

(87) PCT Pub. No.: WO2011/072962
PCT Pub. Date: Jun. 23, 2011

(65) Prior Publication Data
US 2012/0228870 A1 Sep. 13, 2012

(30) Foreign Application Priority Data

Dec. 16, 2009 (DE) .................. 10 2009 054 794

(51) Int. Cl.
*F16L 27/00* (2006.01)
(52) U.S. Cl.
USPC ............ 285/273; 285/121.3; 285/121.5
(58) Field of Classification Search
USPC .............. 285/273, 280, 121.3, 121.5, 98
See application file for complete search history.

(56) References Cited

U.S. PATENT DOCUMENTS

| 2,877,026 A | * | 3/1959 | Payne et al. ............. 277/365 |
| 2,937,029 A | * | 5/1960 | Colby .................. 279/20 |
| 3,442,539 A | * | 5/1969 | Randall ................ 285/190 |
| 4,396,212 A | * | 8/1983 | Honke ................. 285/94 |
| 4,743,162 A | | 5/1988 | Pope | |
| 5,080,401 A | | 1/1992 | Stich | |

(Continued)

FOREIGN PATENT DOCUMENTS

DE 38 06 931 10/1988
DE 41 03 376 8/1992

(Continued)

OTHER PUBLICATIONS

International Search Report issued on Feb. 11, 2011 in International PCT Application No. PCT/EP2010/067327 filed Nov. 11, 2010.

(Continued)

*Primary Examiner* — Aaron Dunwoody
(74) *Attorney, Agent, or Firm* — Drinker Biddle & Reath LLP (57) ABSTRACT

A bush of a radial rotary union joint including a hollow-cylindrical main body whose inner cylindrical surface forms a sliding sealing surface divided by a peripherally extending inner groove into a first and a second sliding sealing surface and having a cylindrical outside surface which is divided by a peripherally extending outer groove into a first and a second outside surface. The wall portion separating the inner and the outer grooves has at least one bore connecting the two grooves. The first and the second outside surface can be sealed off by a stationary sealing ring in relation to a housing embracing the bush. The side surfaces of the inner groove are of the same size within a tolerance threshold of +20% and −35% as the side surfaces of the outer groove. The stationary sealing rings are positioned at an axial spacing from the axially outer end of the oppositely disposed sliding sealing surfaces corresponding to at least 40% and at most 55% of the respective axial length of the sliding sealing surfaces.

7 Claims, 4 Drawing Sheets

(56) References Cited

U.S. PATENT DOCUMENTS

| | | | |
|---|---|---|---|
| 5,199,748 | A | 4/1993 | Jung et al. |
| 6,073,970 | A | 6/2000 | Ott et al. |
| 6,216,977 | B1 | 4/2001 | Setzer et al. |
| 6,401,746 | B1 * | 6/2002 | Scott, Jr. .................. 137/312 |
| 7,823,929 | B2 * | 11/2010 | Hoff et al. .................. 285/121.3 |
| 2011/0074146 | A1 | 3/2011 | Gorczak et al. |

FOREIGN PATENT DOCUMENTS

| | | |
|---|---|---|
| DE | 196 21 020 | 11/1997 |
| DE | 196 21 171 | 11/1997 |
| DE | 10 2008 025 222 | 7/2009 |
| EP | 0 072 657 | 2/1983 |

OTHER PUBLICATIONS

Written Opinion mailed Feb. 11, 2011 in PCT/EP2010/067327 filed Nov. 11, 2010.

German Search Report mailed Oct. 6, 2010 in DE 10 2009 054 794.0 filed Dec. 16, 2009.

* cited by examiner

RADIAL ROTARY FEEDTHROUGH AND BUSHING THEREFOR

CROSS-REFERENCE TO RELATED APPLICATIONS

This application is a §371 National Stage Application of PCT International Application No. PCT/EP2010/067327 filed Nov. 11, 2010, which claims priority to German Patent Application No. 10 2009 054 794.0 filed Dec. 16, 2009, both of which are incorporated herein in their entirety.

BACKGROUND OF THE INVENTION

The present invention concerns a radial rotary union joint and a bush for same, which forms a radial sliding ring seal. The bush comprises a hollow-cylindrical main body whose inner cylindrical surface forms a sliding sealing surface which is divided by a peripherally extending inner groove into a first and a second sliding seal surface. The bush further has a cylindrical outside surface which is divided by a peripherally extending outer groove into a first and a second outside surface, wherein the wall portion separating the inner and the outer grooves has at least one bore connecting the two grooves and wherein the first and the second outer outside surfaces can be sealed off by a respective stationary sealing ring in relation to a housing embracing the bush.

The corresponding rotary union joint has as an essential part at least one such above-defined bush and in addition also comprises a housing for accommodating the bush and possibly has at least one ball bearing between the housing and a rotating shaft embraced by the bush. In that case the bush can be adapted directly to the outside diameter of the corresponding shaft so that the sliding sealing surfaces of the bush slide directly against the shaft surface when the shaft rotates relative to the bush.

However an inner hollow cylinder or a sleeve on which the bush slides can possibly also be part of the rotary union joint, in which case that inner hollow cylinder or the inner sleeve is in use connected fixedly and in sealed relationship in the housing to a corresponding rotating shaft. In that case the sleeve can have the outer cylindrical sliding sealing surfaces which come into sealing and sliding engagement with the sliding sealing surfaces on the inside of the bush. Accordingly that sleeve can take over the function of the rotating shaft in relation to the bush so that all critical interfaces which necessitate very precise surface machining and a high surface quality are disposed within the rotary union joint while the interfaces in relation to the rotating shaft and to external connections are respectively stationary and thus less critical and in that respect for example can also be produced and supplied by different manufacturers.

The shaft can also be a short shaft portion forming a part of the rotary union joint, wherein that shaft portion ends for example in a short flange which can be sealingly connected to a rotating shaft of a corresponding machine.

Hereinafter consideration will be given to the simpler variant in which the bush slides directly on the corresponding outside surface of the shaft or a shaft portion. When a sleeve is interposed, all considerations similarly apply insofar as the sleeve is considered as a part fixedly connected to the shaft or a constituent part of the shaft.

The outer groove is acted upon by a pressurised fluid by way of an outer housing, the fluid passing through the bore which connects the outer and the inner groove into the inner groove and thus to the outside periphery of the shaft which in turn has one or more bores communicating with a correspondingly axially extending passage in the interior of the shaft.

In that way it is possible, during rotation of a shaft, to feed a fluid from the exterior into and through the shaft or conversely out of the shaft and through the bush outwardly, wherein the shaft rotates in the bush and the surfaces sliding against each other of the shaft and the bush form a sliding seal.

It will be appreciated that the friction occurring in such a sliding seal is desirably to be kept as low as possible, especially as at relatively high rotary speeds a corresponding frictional heat is also generated because of the friction involved, and with excessive friction that could also lead to the bush seizing on the shaft. On the other hand as little fluid as possible should escape between the surfaces sliding against each other, especially when dealing with a corresponding leak is relatively complicated and expensive and difficult.

The sliding sealing surfaces of the bushes are therefore produced with very close tolerances and a high degree of precision, and likewise also the complimentary sliding sealing surfaces on a shaft or possibly a corresponding sleeve which is to be fixed on the outside periphery of the shaft, in order to provide a sealing gap which is as narrow and uniform as possible but which nonetheless allows the cylindrical surfaces to slide easily against each other.

However, particularly when the fluid is under high pressure, certain deformations of the bush are inevitable, and they can also influence the configuration of the sealing gap between the surfaces of the shaft and the bush, which slide against each other.

The attempt has already been made in DE 38 06 931 to deliberately provide for such deformation by a suitable choice of the width and depth of the outer groove as well as the position of an outer stationary seal in the shaft in such a way that there was a tendency for the inner sliding sealing surface to be of a conical shape, in which case the larger diameter of the cone was to be directed towards the inner groove and the smaller diameter thereof was respectively facing away from the inner groove.

The result of that however was that the sealing gap enlarges somewhat in the region adjoining the transfer grooves and becomes somewhat narrower at the ends remote from the groove.

That approach however still appears to be worthwhile at comparatively low pressures up to about 100 bars.

In the meantime however it has been found that such a bush configuration, even if it can have a tendency to contribute to a reduction in the leakage rate, only functions satisfactorily at up to pressures of about 100 bars. When higher pressures are involved generally more complicated and expensive systems are used, in which corresponding bushes are for example of a multi-part configuration or are of great axial length to avoid excessive deformation of the bush which otherwise could no longer be tolerated because such deformation would have excessively high leakage rates or could result in seizing of the bush on the shaft and thus damage to the bush or the shaft.

In comparison with that state of the art the object of the present invention is to provide a bush having the features set forth in the opening part of this specification, which even at pressures of markedly above 100 bars and also at relatively high rotary speeds permits the transfer of fluid at low leakage rates. In particular the invention seeks to provide a corresponding bush which still functions well and can be used at pressures of more than 150 bars and in particular at pressures of more than 200 bars.

In that respect the bush should be axially relatively short in order not to take up excessive space.

For a bush having the features set forth in the opening part of this specification that object is attained in that the side surfaces of the inner groove are of the same size within a tolerance range of +20% and −35% as the side surfaces of the outer groove and an outer stationary seal is positioned on the outside surface of the side surface in the axial direction in such a way that it is at an axial spacing from the axially outer end of the sliding sealing surfaces, which corresponds to at least 40% and at most 55% of the respective axial length of the sliding sealing surface.

SUMMARY OF THE INVENTION

The present invention is based on the consideration that the conical deformation of the inner sliding sealing surfaces, which the state of the art aims to achieve, wherein the notional tip of the cone faces away from the rotary union joint, was to be avoided if possible and that the bush overall should be of such a configuration that the forces acting on the numerous different surfaces of the bush at high pressure were to be so absorbed and so compensated that the sliding sealing surface remains substantially cylindrical and is at most slightly conically divergently deformed, which means that the sealing gap is narrower in the region of adjoining the inner groove than in the regions more remote from the groove. In that respect the invention is further based on the consideration that, viewed in an axial section, the pressure forces exert a torque in relation to an axis of symmetry, the position of which is formed by the centre of the cross-section of the wall portion separating the two grooves, and the torques acting on the various surfaces should substantially compensate each other. The torques can be ascertained from the integral in respect of the product of pressure, surface area and spacing relative to the notional axis of rotation, where, because of the spacing which varies over the surface, integration must be effected over that product, and wherein it is further to be noted that the pressure also changes with the spacing relative to the notional axis of rotation, in the region of the sealing gap.

In that respect, for the sake of simplicity, consideration may be given to torques which act in paired oppositely directed relationship and which are exerted for example by the side surfaces of the inner groove and the outer groove in relation to the above-defined axis on the portion carrying the sliding sealing surfaces. A pair of the corresponding torques is equalised if the first and second side surfaces of the grooves are of the same size and if then the mean radial spacing of the inner side surface and the outer side surface from the notional axis of rotation were also the same.

As those side surfaces however are circular ring surfaces of necessarily different radii, that condition in terms of equality of surface area only approximately applies for torque compensation, thus for example if the inside radius of the bush is in any case already relatively large in relation to the outside radius of the bush, and is therefore for example more than 80 or 90% of the outside radius. In that case side surfaces of equal size of the inner and outer grooves also involve approximately the same spacing relative to a notional axis of rotation.

In the case of bushes of relatively small inside diameter with at the same time relatively large outside diameter however in the case of surface area equality in respect of the groove side surfaces, the averaged spacing of the inner groove side surfaces from the notional axis of rotation becomes markedly larger than in the case of the outer groove. It is possible to compensate for that by the inner groove side surface in such a case actually being somewhat smaller than the outer groove side surface. For that reason, asymmetric tolerance thresholds are specified for the size of the groove side surfaces because torque compensation can already be effected when the inner groove side surface is only about 90% or 95% of the outer groove side surface. In particular it may be sufficient if the inner groove is of the same radial depth as the outer groove within a tolerance threshold of −10 and +15%, which can be specified as an alternative condition to surface area equality, in particular for bushes of relatively large inside diameter. In that case the tolerance threshold is displaced asymmetrically upwardly, that is to say in the direction of a larger radial depth for the inner groove.

A further pair of oppositely directed torques is exerted by the pressure on the inner sliding sealing surface and the pressure on the cylindrical outside surface in the region as far as the stationary seal on the outside of the bush which is still acted upon with the full pressure. As the pressure on the sliding sealing surface changes along the length of the sliding sealing gap continuously (generally linearly) and drops from the full pressure to the pressure of zero (or ambient pressure) while the full pressure is involved as far as the seal on the outside of the bush, the corresponding torques are compensated only in a certain region for the position of the outer seal. If the outer seal is moved to an excessively large spacing from the outer groove, then there is rather the tendency to involve the convergently conical shape which the state of the art aims to achieve, while upon a displacement of the position of the outer seal to close to the outer groove there is rather a tendency to involve a divergent deformation of the inner sliding sealing surface. Substantial compensation in respect of the above-indicated torques is obtained at an axial position of the outer seal, which is at least 40 to 55% of the axial length of the sliding sealing surface, measured from the axially outer end of the sliding sealing surface, in which respect however that sealing action is not on the sliding sealing surface but in opposite relationship on the outside surface of the bush.

In addition it is clear that any imbalance in respect of the forces or torques at the one pair of surfaces which were considered hereinbefore can be entirely or partially compensated by a correspondingly reversed imbalance in respect of the torques at the other pair of surfaces so that for example a reduction in the ratio of the inner groove side surface to the outer groove side surface can therefore be compensated by a correspondingly greater axial spacing of the outer seal from the axially outer end of the sliding sealing surface. In other words, if the value falls below the tolerance threshold of −35% for the ratio of the groove side surfaces, that can possibly be compensated by approaching the upper limit of 55% of the axial position of the stationary seal or possibly also exceeding same.

The measures according to the invention have the effect in particular in relation to high pressures that the sliding sealing surfaces retain their cylindrical shape or, viewed from the inner groove, assume a conically slightly divergent shape, that is to say by virtue of the corresponding pressure effects the sealing gap in the proximity of the groove tends to become somewhat smaller while the sealing gap at the outer ends of the sliding sealing surfaces tends to become somewhat larger. That signifies a conical shape for the sliding sealing surfaces with a very small angle which is of the reversed sign in relation to the cone angle as is known from the state of the art. In other words the (notional) tip of such a cone is on the opposite side in relation to the state of the art, in which respect however the exactly cylindrical shape of the sliding sealing surfaces is preferred. In the ideal case therefore the exactly cylindrical shape is maintained for the sliding sealing surface of the bush.

Surprisingly it has been found that, with such a configuration, the bushes which are already known per se in respect of their other features, still function very well even at pressures above 200 bars, that is to say rotary union joints of a corresponding configuration can transfer fluid without unacceptable leakages and without damage to the sliding sealing surfaces when high rotary speeds are involved.

In that respect, the above-described geometry provides for maintaining the cylindrical shape or at most leads to a very slightly conical divergent deformation of the sliding sealing surfaces. For example in a cross-section the centre of the wall portion formed between the bottom of the respective grooves can be imagined as a pivot axis about which the ends of the bush, carrying the sliding sealing surfaces, can "pivot" by virtue of pressure actuation, even if a corresponding "pivot angle" is almost vanishingly small and for example is of the order of magnitude of minutes of a degree or less.

The measures according to the invention are therefore to be viewed in context insofar as the condition that the side surfaces of the inner groove are of the same size as those of the outer groove is to be necessarily observed only when the axial spacing of the outer seal relative to the axially outer end of the corresponding sliding sealing surface is 40% or more of the axial length of the sliding sealing surface. It is possible to compensate for the value falling below or exceeding the tolerance thresholds, under one of the two conditions, by the value of the respective other condition exceeding or falling or below the tolerance thresholds.

It is desirable however if the geometrical relationships of the bush are so adjusted that the torques and forces acting on the various portions of the bush, at a correspondingly high pressure, at most cause slight uniform widening or an only slight divergent deformation of the sliding sealing surfaces so that the compensation effects just described do not have to be taken into consideration. Accordingly in accordance with a preferred embodiment of the invention it is sufficient if the side surfaces of the inner groove are between 0 and 20% smaller than the side surfaces of the outer groove and at the same time the axial position of the outer stationary seal is between 40 and 55% of the axial length of the sliding sealing surface. Alternatively it is sufficient if the radial depth of the inner groove is the same within a tolerance threshold of −10% and +15% as the radial depth of the outer groove and at the same time the axial position of the outer stationary seal is in that case in turn between 40 and 55% of the axial length of the sliding sealing surface.

The outer seal or the sealing rings on the outside of the bush should comprise a material which is as extrusion-resistant as possible as at pressures above 200 bars conventional seals have a tendency to squeeze into the outer gap between the outside surface of the bush and the inside surface of the housing, even if they are accommodated in a groove in the inside surface of the housing, especially when the outside surfaces of the bush and the inside surfaces of the housing, that are in opposite relationship thereto, are not produced with a tight fit in order to give the bush a certain clearance for motion on the rotating shaft.

BRIEF DESCRIPTION OF THE DRAWINGS

Further advantages, features and possible uses of the present invention will be apparent from the description hereinafter of a preferred embodiment and the accompanying Figures in which.

DETAILED DESCRIPTION OF THE INVENTION

Figure 1:
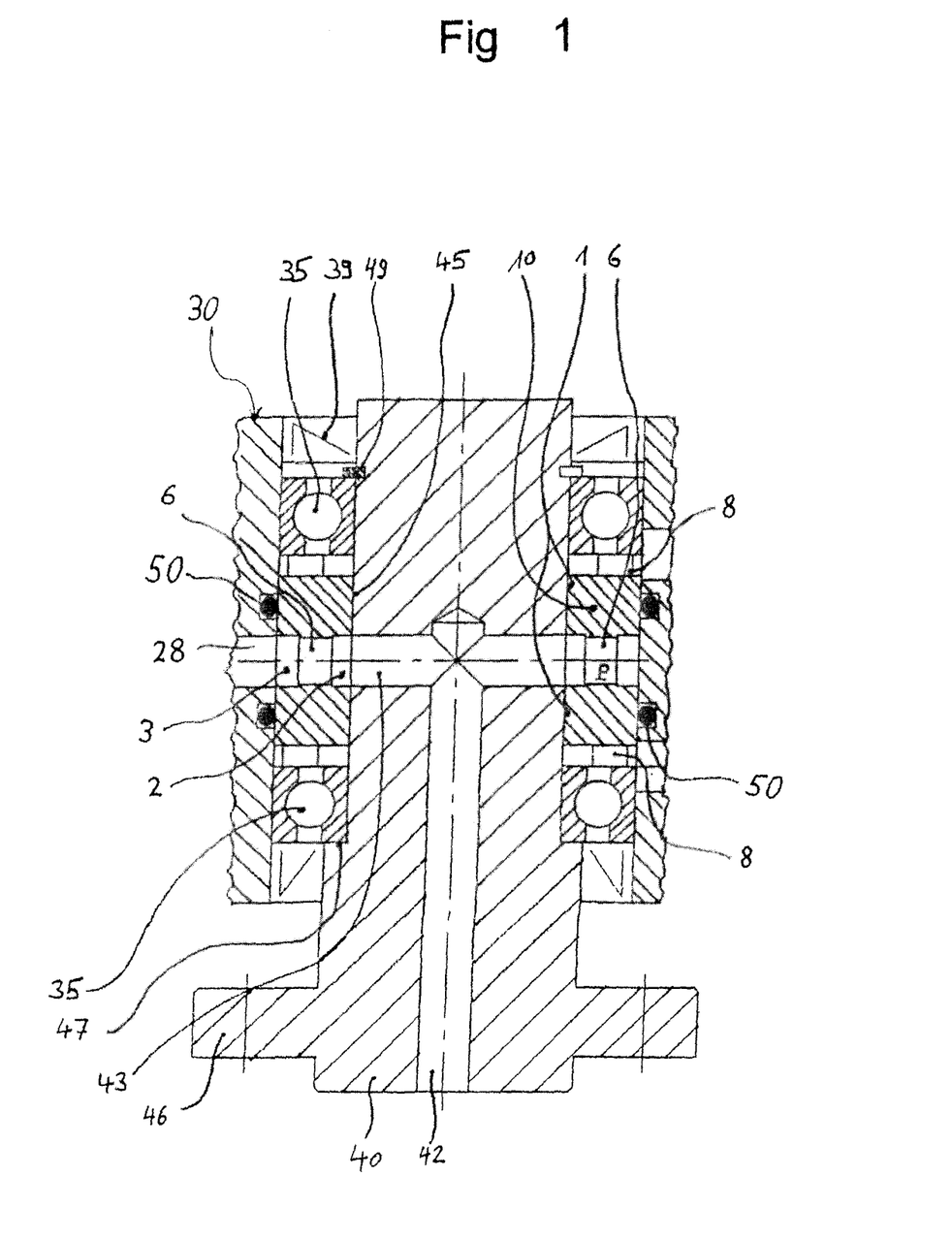
FIG. 1 shows a rotary union joint having a bush having the features according to the invention.

FIG. 1 shows a generally cylindrical housing 30 which is shown here in broken-away form and in which a bush 10 is accommodated. The axial position of the bush 10 in the interior of the housing 30 is fixed by the position of two ball bearings 35, the position of which is in turn fixed by suitable means such as for example an abutment in the form of a radially projecting step or a circlip (not shown) in the housing and which hold the bush 10 in its position. Disposed in turn within the bush 10 is a rotatable shaft 40 which is connected to the inside races of the ball bearings 35 and has an outer cylindrical sliding sealing surface 45 which is in sealing sliding engagement with the sliding sealing surfaces 1a, 1b of the bush 10.

A step 47 on the one hand defines with a circlip 49 at the end of the shaft 40 on the other hand the axial position of the shaft 40 in the rotary union joint. Simple termination seals 39 (not acted upon by pressure) are in sliding contact with the shaft 40 and screen the ball bearings 35 relative to the exterior.

Figure 3:
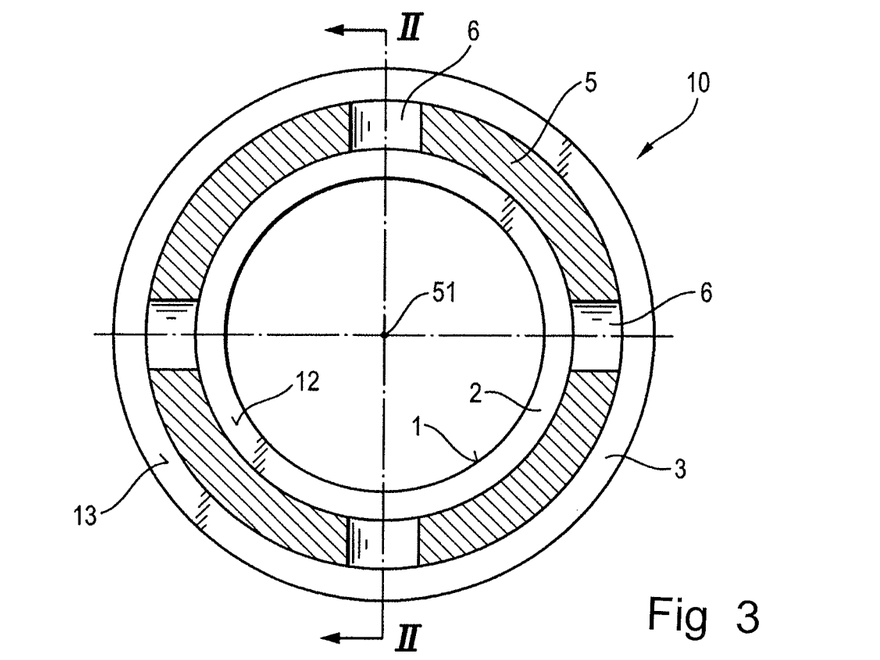
FIG. 3 shows a sectional view through a bush in the plane III-III.
Figure 4:
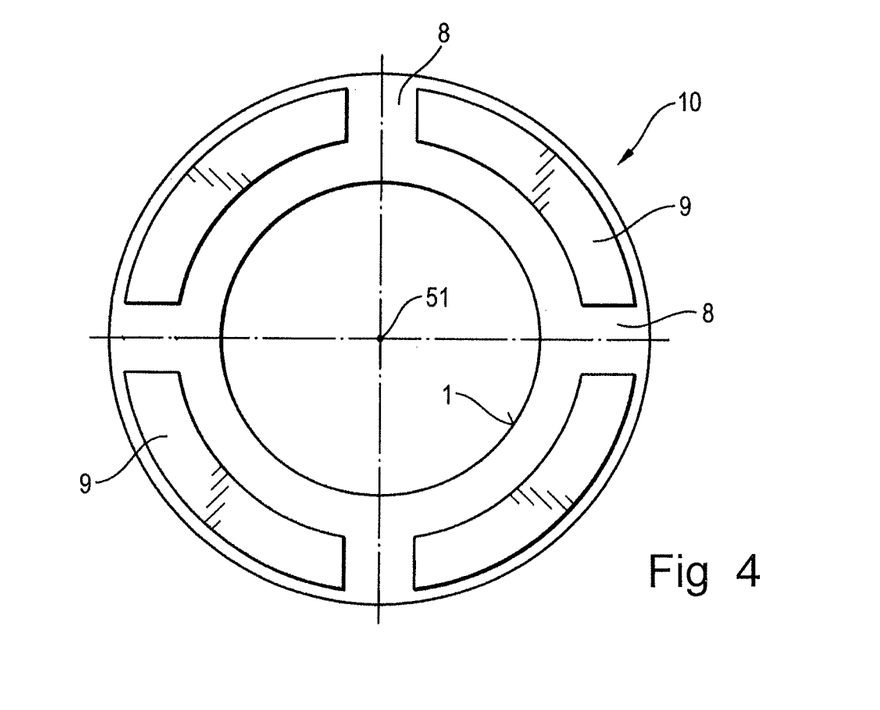
FIG. 4 shows a side view of the bush of FIG. 2 from the right or the left.

The housing 30 has a radial bore 28 in which there is a pressure P. The bush 10 which will be described in greater detail with reference to FIGS. 2 to 4 has an inner groove 2 and an outer groove 3 which are connected together by bores 6 and the axial position of the grooves 2, 3 and bores 6 coincides with the axial position of the feed bore 28 (in which a pressure P prevails). That feed bore 28 is thus in communication with the outer groove 3 in the bush 10 while the inner groove 2 in the bush 10 is in communication with a radial bore 43 in the shaft 40 and the bore 43 is in communication with an axial passage or a bore 42 extending in the longitudinal direction of the shaft 40. In the illustrated embodiment the shaft 40 ends in a flange 46 and a connecting connection to a further rotating machine part or a further rotating shaft, with which the fluid is to be axially supplied along the passage 42.

Fluid which is under high pressure P and which is supplied through the bore 28 therefore goes by way of the groove 3, the bore 6, the groove 2 and the radial bore 43 into the passage 42. The bush 10 is mounted in sealed relationship in the housing 30 by way of sealing rings 7a, 7b. The shaft 40 can rotate with the inside races of the ball bearings 35 and within the bush 10, in which case the cylindrical inside surfaces 1 of the bush 10 slide against the cylindrical outside surface 45 with a very slight radial clearance so that the surfaces 1, 45 form pairs of sliding sealing surfaces.

The fluid in the groove 2 and the adjoining bore 43 is under high pressure and thus also passes between the sliding sealing surfaces 1, 45 which however form such a narrow sealing gap that the fluid can pass only to a very slight extent through that sealing gap and can then be fed back by way of the leakage bores 8 and a common passage connecting the leakage bores (not shown), and a discharge opening (not shown).

The details of the bush 10 will now be described with reference to FIGS. 2 to 5.

Figure 2:
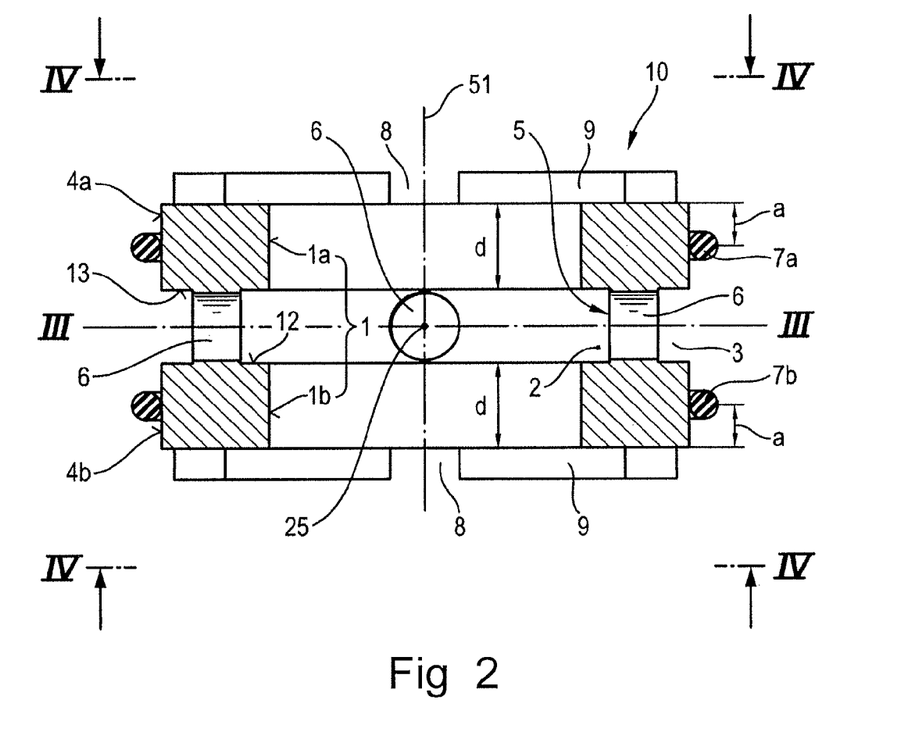
FIG. 2 shows an axial section through the bush along the plane II-II.

FIG. 2 shows a bush in an axial longitudinal section containing the axis 51 of the bush. The bush 10 comprises a substantially hollow-cylindrical main body having cylindrical inside surfaces 1 and cylindrical outside surfaces 4a, 4b which are respectively divided by grooves 2, 3 on the inside surface and the outside surface into first and second portions 1a, 1b of the cylindrical inside surfaces 1 and 4a, 4b of the cylindrical outside surfaces 4. It is possible to see at each end a ring-shaped projection 9 which does not necessarily have to be provided but is only optionally provided and optionally defines a leakage space and has bores 8 for the discharge of leakage fluid.

A respective sealing ring 7a, 7b can be seen on each of the outside surfaces 4a, 4b, wherein the sealing ring 7a or 7b is at a given axial spacing a from the axially outer end of the sliding sealing surfaces 1a and 1b respectively. That spacing a is between 40 and 55% of the axial total length d of the respective oppositely disposed cylindrical inside surfaces 1a and 1b. The two grooves 2 and 3 are of a certain radial depth which is so established that the side surfaces 12 of the inner groove 2, that are in the form of circular rings, are approximately exactly the same size or somewhat smaller than the side surfaces 13 of the groove 3, that are in the form of circular rings. In particular the surface 12 should be at most 35% smaller than the surface 13, but it can also be up to 20% larger than the surface 13 if the spacing a of the sealing ring is only 40% or less in relation to the length d of the sliding sealing surfaces. The two grooves 2, 3 are separated by a wall portion 5 connecting the right and left portions of the bush 10, that are in the shape of rings or cylinders, the wall portion 5 having extending therethrough bores 6 which interconnect the grooves 2 and 3.

Figure 5:
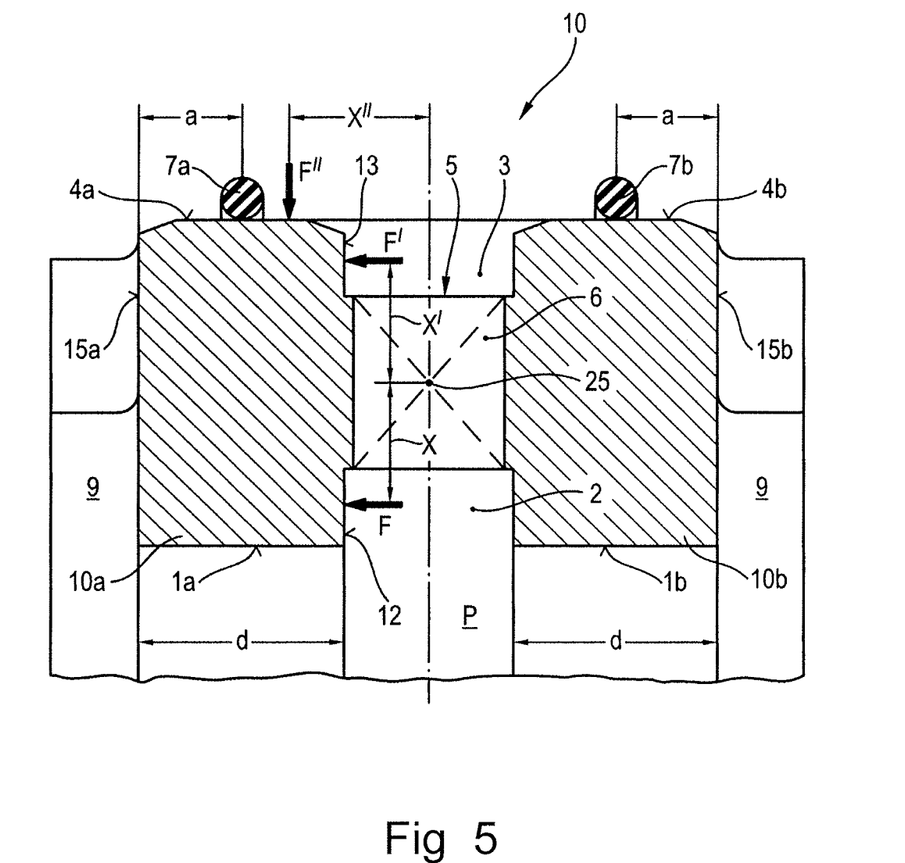
FIG. 5 shows a portion on an enlarged scale from FIG. 2.

The bores 6, the grooves 2, 3 and the region of the cylindrical outside surfaces 4a, 4b of the groove 3 as far as the seals 7a, 7b are acted upon by the pressure P in the feed bores 28. That pressure can be for example 300 bars and more. In that way the bush portions at the right-hand and left-hand side can be subjected to forces which tend to deform the bush. The intersection of two broken lines in the above-illustrated bore 6 which at the same time defines the cross-section of the wall portion 5 defines the axis of rotation 25 which extends perpendicularly to the surface of the view and in relation to which the right-hand and left-hand cylindrical portions of the bush can pivot by small amounts. That is illustrated once again by means of a portion on an enlarged scale from FIG. 2, as shown in FIG. 5. The pressure P which acts in the grooves 2 and 3 on the groove side surfaces 12 and 13 produces a torque in relation to the notional axis 25, which is the area integral of the product of the force F acting on the surface 12 with the respective vertical spacing relative to the axis of rotation 25. A similar but oppositely acting torque is afforded by integration of the force F acting on the surface 13, once again multiplied by the spacing that is vertical in FIG. 5 between the force and the axis of rotation 25. A further torque on the respective bush portion is exerted by a radially inwardly acting force F (acting downwardly in FIG. 5) and which is operative in the region of the outside surfaces 4a, 4b, which is between the groove 3 and the seal 7a or 7b respectively. In this case also integration must be again effected in respect of the product of the force and the horizontal spacing of the force relative to the notional axis 25, wherein the differential force dF is afforded as the product P×dA (with the pressure P and the area element dA) and thus has to be integrated over the corresponding surface.

That surface is a cylindrical outside surface 4a, 4b of the axial length d−a when a defines the position of the seal 7a or 7b respectively from the axially outer end of the sliding sealing surfaces 1a and 1b respectively and d is the axial length of those sliding sealing surfaces 1a and 1b respectively.

Any bevels in the corner regions between the groove and the cylindrical peripheral surface can be ignored or replaced by calculation by a corresponding right-angled addition.

Finally a torque also acts by virtue of the pressure which is exerted by the fluid in the sealing gap between the sliding sealing surfaces 1a and 1b and the surfaces 45 of a shaft 40, that are in sliding contact therewith. As this involves sliding sealing surfaces or a sliding sealing gap, it is possible in a first approximation to assume that the pressure linearly falls over the length of the gap from the maximum pressure at the transition to the groove 2 to the ambient pressure at the axially outer end of the sealing gap. In this case also it is possible again to calculate the resultant torque as the area integral of the force multiplied by the spacing relative to the axis of rotation 25.

It is then desirable for the surfaces 12, 13 to be of such a configuration that the moments acting on those surfaces approximately compensate from each other and the torques acting on the surfaces 1a, 1b on the one hand and 4a, 4b on the other hand also compensate from each other. That leads to the condition already mentioned hereinbefore, that the surfaces 12, 13 should be approximately of the same size, wherein the surface 12 can also have a tendency to be somewhat smaller than the surface 13 and the spacing a is in the region of 40 to 55% of the axial length d of the sliding sealing surfaces 1a and 1b respectively.

Alternatively the depth of the inner groove 2 can be approximately the same as the depth of the outer groove 3 while the position of the sealing ring also varies in the range already mentioned above.

For the purposes of the original disclosure it is pointed out that all features as can be seen by a man skilled in the art from the present description, the drawings and the claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features and emphasis of the independence of the individual features from each other is dispensed with here only for the sake of brevity and readability of the description.

The invention claimed is:

1. A rotary union joint comprising a housing and a bush which is accommodated in sealing relationship in the housing and which has inside surfaces in the form of sliding sealing surfaces for sealing sliding engagement with a rotation machine part, wherein the bush comprises a hollow-cylindrical main body whose inner cylindrical surface forms a sliding sealing surface divided by a peripherally extending inner groove into a first and a second sliding sealing surface and having a cylindrical outside surface which is divided by a peripherally extending outer groove into a first and a second outside surface, wherein a wall portion separating the inner and the outer grooves has at least one bore connecting the two grooves and wherein the first and the second outside surface can be sealed off by a respective stationary sealing ring in relation to a housing embracing the bush, wherein the side surfaces of the inner groove are of the same size within a tolerance threshold of +20% and −35% as the side surfaces of the outer groove and the stationary sealing rings are so positioned on the outside surfaces of the bush in the axial direction that they are at an axial spacing from the axially outer end of the oppositely disposed sliding sealing surfaces, that corresponds to at least 40% and at most 55% of the respective axial length of the sliding sealing surfaces, wherein the bush is configured to withstand pressures of at least 100 bar.

2. The rotary union joint according to claim 1, wherein the radial depth of the inner groove is at least ⅙ of the difference in the radii of the outside surface and the sliding sealing surface.

3. The rotary union joint according to claim 1, wherein a wall portion connecting the inner and outer grooves has a plurality of radial bores at equal angular spacings.

4. The rotary union joint according to claim 1, wherein the axial length of the sliding sealing surfaces is greater than the axial length of the inner groove.

5. The rotary union joint according to claim 1, wherein ends of the bushes have axial annular projections, the inside diameter of which is larger than that of the sliding sealing surfaces and the outside diameter of which is smaller than that of the outside surfaces and which have at least one opening extending radially through the ring projection.

6. A rotary union joint according to claim 1, further comprising a second bush, wherein the two bushes are axially successively arranged bushes, which are accommodated in sealed relationship in the housing and which has inside surfaces in the form of sliding sealing surfaces for sealing sliding engagement with a rotating machine part.

7. The rotary union joint according to claim 1, wherein the sealing rings comprise an extrusion-resistant material.

* * * * *